United States Patent [19]

Kusaka et al.

[11] Patent Number: 5,366,425
[45] Date of Patent: Nov. 22, 1994

[54] CONTROL SYSTEM FOR SELECTING A RETARDER MODE SHIFTING PATTERN FOR A SELF-PROPELLED MOTOR VEHICLE

[75] Inventors: Kohei Kusaka; Yasunori Ohkura, both of Kanagawa, Japan

[73] Assignee: Kabushiki Kaisha Komatsu Seisakusho, Japan

[21] Appl. No.: 862,765

[22] PCT Filed: Dec. 26, 1990

[86] PCT No.: PCT/JP90/01714
§ 371 Date: Jul. 8, 1992
§ 102(e) Date: Jul. 8, 1992

[87] PCT Pub. No.: WO91/10085
PCT Pub. Date: Jul. 11, 1991

[30] Foreign Application Priority Data
Dec. 26, 1989 [JP] Japan ................................ 1-334974

[51] Int. Cl.$^5$ ................... F16H 59/22; F16H 61/10
[52] U.S. Cl. ............................................. 477/118
[58] Field of Search ................ 74/866; 364/424.1; 192/4 A; 477/118, 119

[56] References Cited

U.S. PATENT DOCUMENTS

| | | | |
|---|---|---|---|
| 4,823,646 | 4/1989 | Yoshimura et al. | 74/866 |
| 4,829,435 | 5/1989 | Isono | 192/44 A |
| 4,933,850 | 6/1990 | Wheeler | 74/866 X |
| 4,996,893 | 3/1991 | Nakamura et al. | 74/866 |
| 5,016,495 | 5/1991 | Takizawa | 192/4 A X |
| 5,069,085 | 12/1991 | Iizuka | 74/866 |
| 5,161,432 | 11/1992 | Matsumoto et al. | 74/866 |

FOREIGN PATENT DOCUMENTS

| | | | |
|---|---|---|---|
| 59-98149 | 7/1984 | Japan | F16H 5/40 |
| 59-117944 | 7/1984 | Japan | F16H 5/16 |
| 61-235242 | 10/1986 | Japan | B60K 41/28 |
| 63-12827 | 3/1988 | Japan | B60T 7/12 |

*Primary Examiner*—Charles A. Marmor
*Assistant Examiner*—Khoi Q. Ta
*Attorney, Agent, or Firm*—Ronald P. Kananen

[57] ABSTRACT

A method of automatically changing the speed of a self-propelled motor vehicle while supplying an adequate amount of cooling oil to a retarder during retarder operation, avoids unnecessary shifting even under conditions wherein an accelerator is released. The method of automatic speed change is so adapted as to move the shift points at each stage of speed to a higher vehicle-speed side as compared with normal driving.

8 Claims, 5 Drawing Sheets

CONTROL SYSTEM FOR SELECTING A RETARDER MODE SHIFTING PATTERN FOR A SELF-PROPELLED MOTOR VEHICLE

TECHNICAL FIELD OF THE INVENTION

The present invention relates to a method of automatically changing the speed of a self-propelled motor vehicle with an automatic transmission and a retarder.

BACKGROUND ART OF THE INVENTION

Conventionally it is known for an automatic speed change of a self-propelled motor vehicle, to have the output side of an engine connected to a torque converter, the output side of the torque converter connected to the input side of an automatic transmission having a plurality of speeds, and the output side of the transmission connected to the right and left driving wheels through a differential mechanism. It is also known that where the vehicle speed is increased or decreased in accordance with a relation between engine torque and the vehicle speed, transmission shift points are set on the basis of the vehicle speed. It is also known for the vehicle speed to be detected using the transmission output shaft rotational speed so that when the vehicle speed has exceeded the shift point, the transmission is automatically shifted to the next speed.

For example, as indicated by a dotted line in FIG. 5, gear-shift points $f_{1N}$ to $f_{6N}$ are set in accordance with a relation between engine torque and vehicle speed in the forward first speed $F_1$ to forward seventh speed $F_7$; when the vehicle speed has exceeded the shift points, the transmission is automatically shifted to the next speed.

However, in a self-propelled motor vehicle equipped with a retarder which is used when continuously running down a slope, cooling oil is supplied to cool the retarder during retarder operation. Therefore, during the retarder operation, the engine speed must be raised to increase the amount of the cooling oil discharged from a cooling oil discharge pump, and to ensure that sufficient oil is supplied to the retarder.

According to this conventional technique, the shift points indicated by the full lines in FIG. 5 is moved to a higher vehicle-speed side (indicated by the dotted lines) so that the engine speed can be increased as compared with normal driving.

According to the above-described method of changing the vehicle speed, when the accelerator is released in an attempt to control the speed at the top of a hill or at the beginning of a rough road, for example when a driver releases his foot from the accelerator pedal, the shift point is moved to the high vehicle-speed side in response to an accelerator off signal, thereby allowing an automatic downshift even when the vehicle speed has dropped only a little.

In more detail, as shown in FIG. 5, when the vehicle is traveling (for example) at the point D at a vehicle speed of $V_{4D}$ and in gear $F_4$, and the accelerator is released in an attempt to control the vehicle speed at the beginning of a rough road, the shift mode pattern will be changed from the dotted line to the full line. Therefore, in the ordinary shift mode indicated by the dotted line, the amount of deceleration before shifting down to $F_3$ is $V_{4D}-V_{3N}=d_N$. However, when the vehicle is running in a high vehicle-speed mode indicated by the full line, the deceleration range becomes as narrow as $V_{4D}-V_{3H}=d_H$ ($d_H<d_N$).

If the transmission is operated as described above, shifting frequency will increase, with the result that the longevity of the transmission will not only be reduced but impart an unpleasant drive feeling to the driver because of the down-shift being effected regardless of the driver's intentions.

SUMMARY OF THE INVENTION

The present invention has been proposed in view of the above-described circumstances encountered with the prior art, and has as its object the provision of a method of automatic speed change of a self-propelled motor vehicle in which the cooling oil can be supplied sufficiently to the retarder during retarder operation, and in which unnecessary downshifting will not take place in response to the accelerator being released.

In order to attain the above-mentioned object, the present invention provides a method of automatic speed change of a self-propelled motor vehicle equipped with an automatic transmission and a retarder, in which a gear shift is automatically made at a shift point preset in accordance with the vehicle speed. When the accelerator is in an off or idle position and the retarder has been operated for at least a preset period of time, the shift pattern for each speed is shifted to the higher vehicle-speed side.

According to the above-described method of automatic speed change, when driving down a slope with the retarder operating, the shift points move to the higher vehicle-speed side. Accordingly, the engine speed increases, thereby increasing the amount of the cooling oil which is supplied to the retarder, which is therefore adequately cooled.

Furthermore, since the shift points will not change simply in response to the accelerator pedal being released and assuming the off or idle state, an unnecessary shift will not be made if the accelerator pedal is released at the top of a hill or at the beginning of a rough road. Therefore, the durability of the transmission can be improved and no unpleasant shift feelings will be imparted to the driver.

The above-mentioned and other objects, aspects and advantages of the present invention will become apparent to those skilled in the art from the following description and accompanying drawings in which preferred embodiments incorporating the principles of the present invention are shown by way of examples only.

DETAILED DESCRIPTION OF THE PREFERRED EMBODIMENTS

Hereinafter the method of automatic speed change of the present invention will be described in detail with reference to the accompanying drawings.

Figure 3:
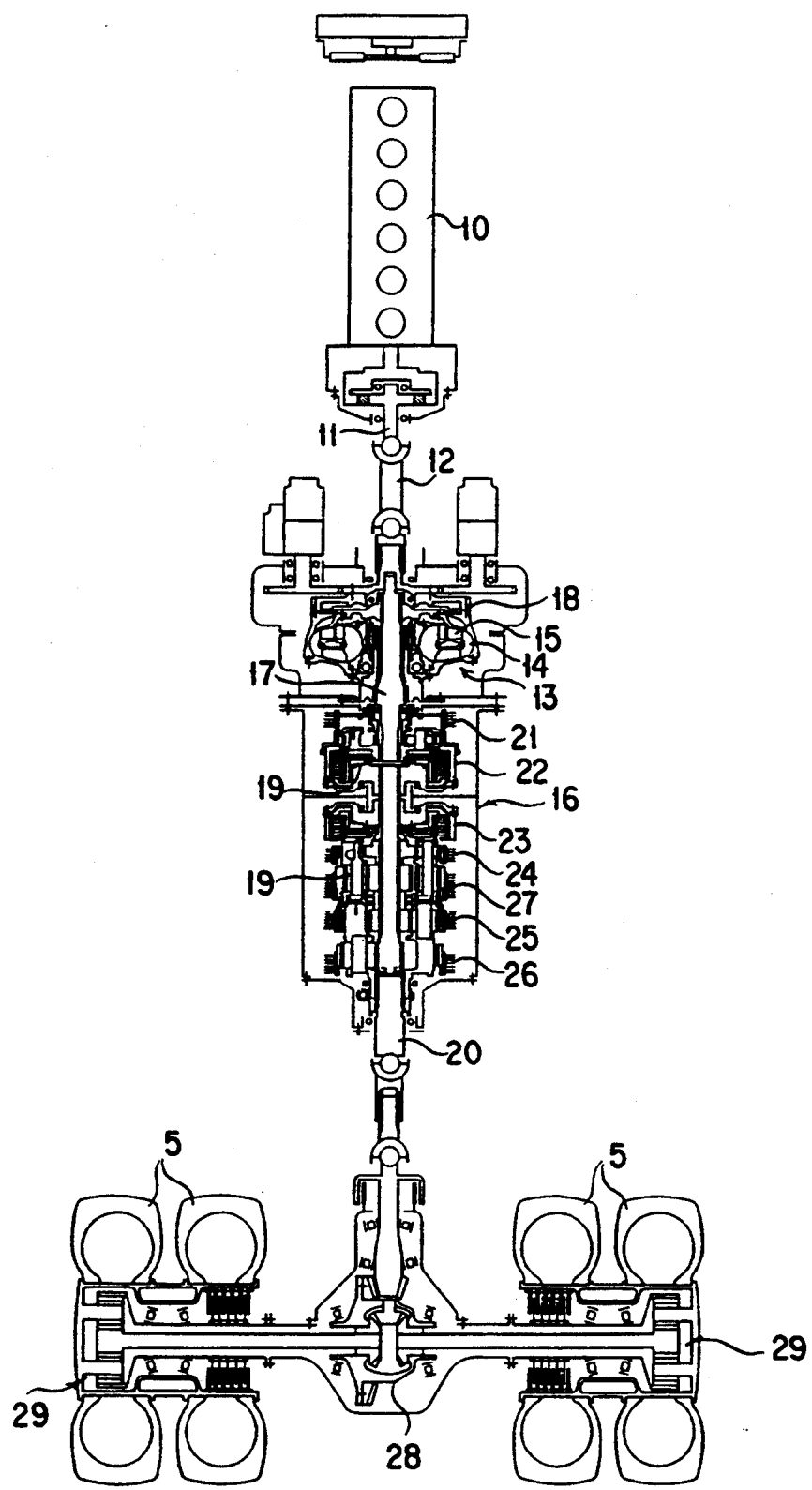
FIG. 3 is an explanatory view of a power train including a transmission mechanism.
Figure 4:
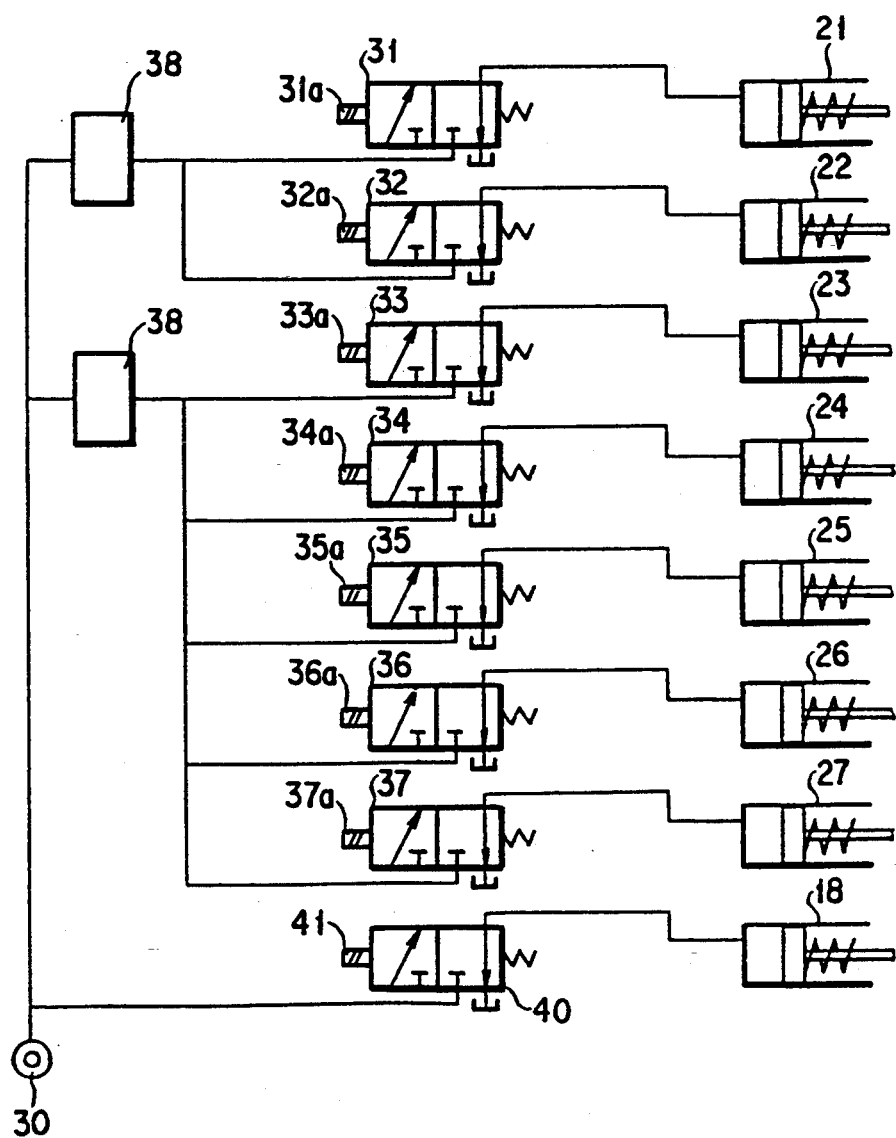
FIG. 4 is a hydraulic circuit diagram depicting gear-shift control valves.
Figure 5:
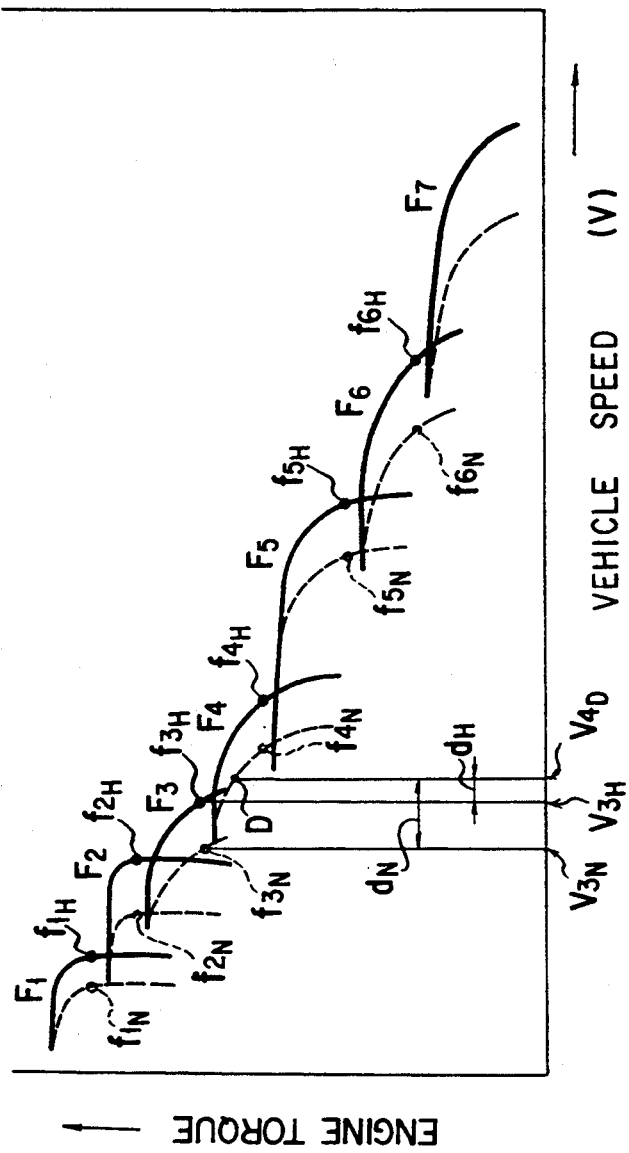
FIG. 5 is a chart showing a shift pattern referred to in the above discussion of the prior art and associated drawbacks.

As shown in FIG. 3, an output shaft 11 of an engine 10 is coupled with a pump rotor 14 of a torque converter 13 through a drive shaft 12. A turbine rotor 15 is connected with an input shaft 17 of a transmission 16, and is provided with a lockup clutch 18 for connecting the pump rotor 14 to the turbine rotor 15. In the automatic transmission 16, a shift can be automatically made into forward first to seventh gears and one reverse by connecting the input shaft to the output shaft through a plurality of planetary gear mechanisms 19 and by connecting and disconnecting a high-speed clutch 21, a low-speed clutch 22, first to fourth clutches 23 to 26 and a reverse clutch 27. The output shaft 20 of the automatic transmission 16 is connected to the driven wheels 20 through a differential 28 and a final reduction gear 29.

The connection and disconnection of the clutches stated above are controlled by selectively controlling the pressure oil discharged from a pump 30, by way of first to seventh shift valves 31 to 37. The first to seventh shift valves 31 to 37 are so designed as to be opened to a supply position by energizing the solenoids 31a to 37a, and to assume a cutoff position when the solenoids are de-energized. Also mounted on the input side of the first and second shift valves 31 and 32 and on the input side of the third to seventh shift valves 33 to 37 are modulation valves 38, which insure a smooth increase in the oil pressure supplied to each of the clutches. The lockup clutch 18 is supplied with pressurized oil from the pump 30 through a lockup changeover valve 40. When a solenoid 40a is energized, the valve 40 is opened to connect the lockup clutch 18, with the result that the pump rotor is connected to a turbine rotor 15. When the solenoid 40a is de-energized, the valve 40 is closed to disconnect the lockup clutch 18.

Figure 1:
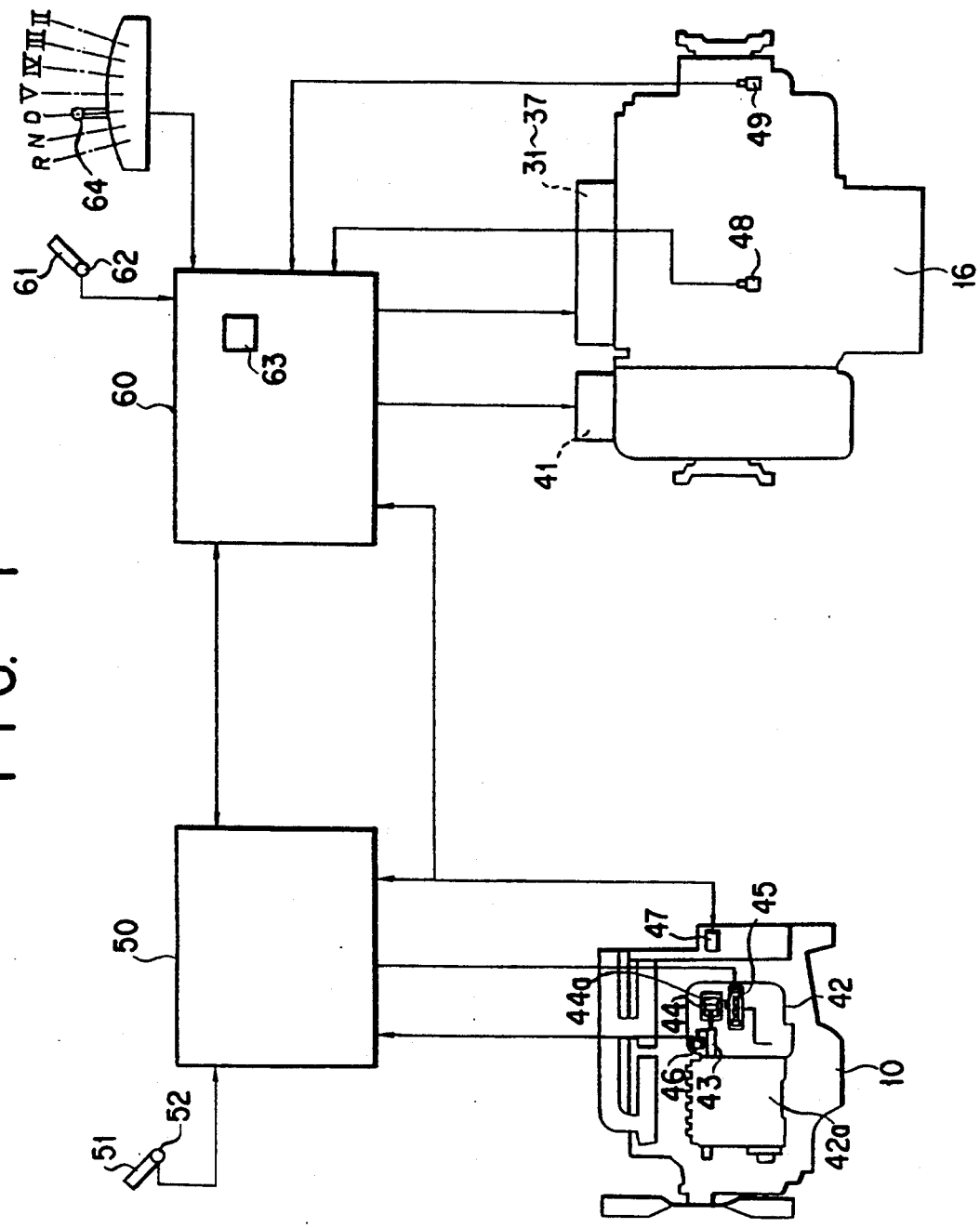
FIG. 1 is a general schematic view explaining a device embodying a method of automatic speed change control according to/the present invention.

In FIG. 1, the engine 10 is equipped with a fuel injection pump 42a having an electronic control governor 42 for controlling the amount of fuel to be injected. The electronic control governor 42 is designed to be reciprocated on a rack 43 by means of a cylinder 44 in order to control the amount of fuel injection. A chamber 44a of the cylinder 44 is supplied with the pressure oil discharged from an oil pressure source not illustrated, through a control valve 45. Further, the engine is provided with a rack position sensor 46 consisting of a differential transformer, and also with an engine speed sensor 47 for sensing the speed of revolution of the engine output shaft 11. The transmission 16 is provided with an input shaft speed sensor 48 and an output shaft speed sensor 49 for sensing the speed of revolution of the input shaft 17 and the output shaft 20 respectively.

A reference numeral 50 refers to an engine controller. When an accelerator pedal 51 is depressed, the amount of this pedal depression (accelerator opening) is sensed by an accelerator sensor 52, which outputs an accelerator opening signal to the engine controller. The engine controller, upon receiving the signal, outputs a control signal to the control valve 45, controlling the supply of the pressure oil from the oil pressure source to the chamber 44a of the cylinder 44. Thus, the governor 42 reciprocates on the rack 43 to control a rack position sensed by the rack position sensor 46 to a rack position corresponding to the accelerator opening signal.

Numeral 60 denotes a transmission controller. It computes the vehicle speed on the basis of input shaft speed or output shaft speed and engine speed from the input shaft speed sensor 48 or the output shaft speed sensor 49 of the transmission 16 and the engine speed sensor 47, and outputs control signals to the first to seventh shift valves 31 to 37 and to the lockup changeover valve 41 when the vehicle speed has exceeded the preset shift point, disconnecting the lockup clutch 18. Then, after the lockup clutch 18 is disconnected, a shift is made automatically to a higher or lower speed than the current speed. After the shift is completed, the lockup clutch 18 is connected to effect direct connection of the transmission 16 with the engine 10. When a retarder operation signal is continuously outputted for over a set period of time from the sensor 62 of the retarder 61, the shifting operation is switched to the retarder mode.

For example, the transmission controller 60 is provided with a timer 63 which integrates retarder operation time. This timer 63 is designed to count up the retarder operating time in accordance with a retarder operation signal and an accelerator-off signal. The timer 63 counts and integrates the retarder operation time without resetting so long as the accelerator is in the off position even irrespective of whether the brake is applied and released during retarder operation.

That is to say, the retarder functions also as a brake in ordinary operation; when the brake is applied, the retarder operation signal is outputted, and when the brake is released, this signal ceases to be outputted. Once the retarder operation signal is inputted, however, the timer 63 will not be reset as long as the accelerator remains in the off (idle) position.

For the control of gear-shifting operation in the retarder mode, the shift points are raised similarly as in conventional techniques, to insure a sufficient flow rate of cooling oil.

Furthermore, the transmission controller has an accelerator full mode in which acceleration and engine torque are used in ordinary shifting operation control, and an accelerator partial mode in which unnecessary shifting is reduced to the utmost. In the accelerator full mode, the shift points are set with importance placed on acceleration and engine torque. In the accelerator partial mode, the shift points are set as low as possible to thereby widen the speed range of each of the gears.

Figure 2:
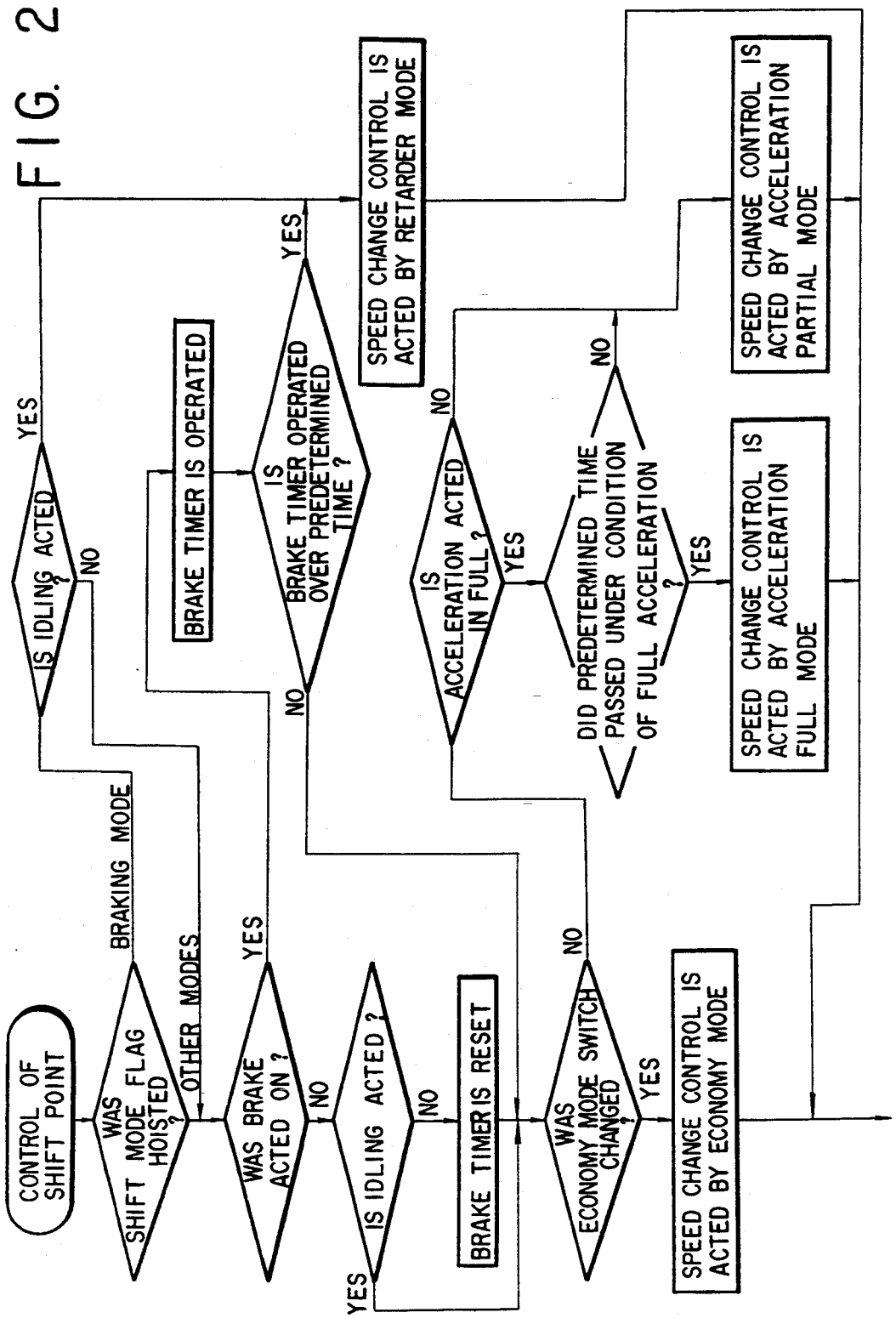
FIG. 2 is a flowchart showing the steps or operations which characterize the invention.

FIG. 2 is a flowchart showing the above-described operation. The first query (i.e., "Was Shift Mode Flag Hoisted?") illustrates a feature of the present invention which provides that if the control of gear-shifting operation is detected as being in the retarder mode, it will remain in the retarder mode as long as an idling condition is maintained. The shift points (engine speed) in each mode are exemplified by the following table.

The transmission controller 60 is fed with shift position signals R, N, D, V, IV, III, and II from a shift lever 64. When the signal R is inputted, a shift is made into Reverse; when the N signal is inputted, a shift is made into Neutral; and when the other signals D, V. IV, III, and II are inputted, the shift is automatically made between preset groups of gears.

| Shift mode | Shift direction | Shift point (Engine) rpm |
|---|---|---|
| Acceleration full | Upshift (Acceleration) | 2230 |
|  | Downshift | 1500 |

-continued

| Shift mode | Shift direction | Shift point (Engine) rpm |
|---|---|---|
| Acceleration partial | (Deceleration) Upshift | 2100 |
| | (Acceleration) Downshift | 1200 |
| Retarder mode | (Deceleration) Upshift | 2450 |
| | (Acceleration) Downshift | 1550 |
| | (Deceleration) | |

The shifting operating control in the retarder mode starts only after the lapse of a preset time after the retarder operation signal is inputted with the accelerator released. That is, the shifting operation control in the retarder mode will not start only in response to the accelerator being released and therefore the shift points will not move if the accelerator is released at the top of a hill or at the beginning of a rough road. Unnecessary shifting therefore will not be induced.

Further, the timer 63 will not be reset even if, while the accelerator is off, the retarder is repeatedly switched on and off after initially being started. It is therefore possible to raise the shift points by the shifting operation control in the retarder mode irrespective of the retarder being switched on and off during downhill driving.

When the accelerator is in released position, the shifting operation control is performed in the accelerator partial mode, and therefore the shift points move down to decrease the speed of the engine when a shift is made, thereby alleviating shift shock.

What is claimed is:

1. A shift control system for an automatic power transmission for a self-propelled motor vehicle having a retarder, comprising:
   vehicle speed detecting means for detecting a vehicle speed;
   accelerator off state detecting means for detecting an accelerator being held at a fully released position;
   shifting pattern storing means for storing shifting pattern data for said automatic power transmission, which shifting pattern data includes a first mode pattern representative of a standard shifting pattern and a second mode pattern distinct from said first mode pattern and having shifting points at respective transmission speed ratios which are at a higher engine speed than said, first mode pattern;
   retarder active state detecting means for detecting an active state of said retarder;
   shift control means for operating said automatic power transmission for selecting an optimal speed ratio on the basis of said vehicle speed and an engine torque output according to a selected one of said first and second mode patterns; and
   shifting pattern selecting means for normally selecting said first mode pattern and responsive to said accelerator off state detecting means detecting a fully released position of the accelerator and said retarder active state detecting means detecting an active state of said retarder, for selecting said second mode pattern when said retarder active state is detected for said predetermined period of time, said timer means being reset when neither said retarder active state nor said accelerator fully released position are detected.

2. A shift control system for an automatic power transmission for a self-propelled motor vehicle having a retarder, comprising:
   vehicle speed detecting means for detecting a vehicle speed;
   accelerator position detecting means for detecting an accelerator position;
   shifting pattern storing means for storing shifting pattern data for said automatic power transmission, which shifting pattern is variable between a first mode representative of a standard shifting pattern and a second mode distinct from said first mode and adapted for a demanded deceleration state of the vehicle;
   demanded deceleration detecting means for detecting a manually entered demand for deceleration of the vehicle;
   shift control means for operating said automatic power transmission for selecting an optimal speed ratio on the basis of said vehicle speed and an engine torque output according to a selected one of said first and second mode patterns; and timer means for counting a predetermined period of time;
   shifting mode selecting means for normally selecting said first mode and responsive to a mode switching condition, in which said demanded deceleration detecting means detects a manually entered demand for vehicular deceleration, for selecting said second mode pattern when said mode switching condition is detected for said predetermined period of time, said timer means time being reset when neither said mode switching condition nor a fully released position of the accelerator are detected.

3. A shift control system as set forth in claim 2, wherein said demanded deceleration detecting means detects an active state of said retarder.

4. A shifting control system a set forth in claim 2, wherein said shifting pattern storing means includes a plurality of shifting patterns which can be selected while said first mode is active depending upon an accelerator position as monitored by said accelerator position detecting means.

5. A shift control system a set forth in claim 4, wherein said shifting pattern storing means includes a power mode which is selected when said accelerator is maintained at a fully depressed position for a given period of time.

6. A shift control system as set forth in claim 4, wherein said shift pattern storing means contains at least one shifting pattern which is selected in response to a manual entry of a selection command.

7. A shift control system for an automatic power transmission for a motor vehicle having a retarder, comprising:
   vehicle speed detecting means for detecting vehicle speed;
   accelerator off state detecting means for detecting an accelerator being in a fully released position;
   shift pattern storing means for storing shift pattern data for said automatic power transmission, said shift pattern data including a first mode pattern representative of a standard shift pattern and a second mode pattern which is distinct from said first mode pattern and which has shift points for each respective transmission speed ratio which are set at a higher engine speed than the corresponding shift points of said first mode pattern;

retarder active state detecting means for detecting an active state of said retarder;

shift control means for operating said automatic power transmission for selecting an optimal speed ratio on the basis of said vehicle speed and an engine torque output according to a selected one of said first and second mode patterns; and timer means for counting a predetermined period of time;

shift pattern selecting means Which normally selects said first mode and which is responsive to said accelerator off state detecting means and said retarder active state detecting means, for selecting said second mode pattern when said retarder active state is detected for said predetermined period of time, said timer means being reset when neither said retarder active state nor said accelerator fully released position are detected.

8. A shift control system for an automatic power transmission for a motor vehicle having a manually operable accelerator and a retarder, comprising:

first means for detecting vehicle speed;
second means for detecting accelerator position;
third means for storing transmission shift pattern data including a first standard shifting pattern which is adapted for normal operation and a second shifting pattern which is adapted for vehicular deceleration;
fourth means for detecting a manually generated demand for deceleration of the vehicle;
shift control means, responsive to said first means, for operating said automatic power transmission and for selecting an optimal speed ratio on the basis of vehicle speed and an engine torque output according to a selected one of a normal mode shift pattern and a deceleration mode shift pattern; and timer means for counting a predetermined period of time;
shift mode selecting means, responsive to said second and fourth means, for normally selecting said normal mode shift pattern and for selecting said deceleration mode shift pattern in response to said fourth means detecting a demand for deceleration for more than said predetermined period of time, said timer means being reset when neither said demand for deceleration nor a fully released position of the accelerator are detected.

* * * * *